United States Patent
Lerner et al.

(10) Patent No.: US 8,050,368 B2
(45) Date of Patent: Nov. 1, 2011

(54) NONLINEAR ADAPTIVE PHASE DOMAIN EQUALIZATION FOR MULTILEVEL PHASE CODED DEMODULATORS

(75) Inventors: Gregory Lerner, Petach Tikva (IL); Yossi Tsfati, Rishon Letzion (IL)

(73) Assignee: Texas Instruments Incorporated, Dallas, TX (US)

( * ) Notice: Subject to any disclaimer, the term of this patent is extended or adjusted under 35 U.S.C. 154(b) by 1108 days.

(21) Appl. No.: 11/754,489

(22) Filed: May 29, 2007

(65) Prior Publication Data

US 2008/0298453 A1   Dec. 4, 2008

(51) Int. Cl.
*H03D 1/04* (2006.01)

(52) U.S. Cl. ........ 375/346; 375/229; 375/230; 375/231; 375/232; 375/233; 375/234; 375/235; 375/236; 375/279; 375/280; 375/281; 375/282; 375/283; 375/286; 375/316; 375/322; 375/327; 375/329; 375/330; 375/331; 375/332; 375/333; 375/340; 375/348

(58) Field of Classification Search .......... 375/229–236, 375/279–283, 329–333, 264, 346, 348; 370/215
See application file for complete search history.

(56) References Cited

U.S. PATENT DOCUMENTS

| | | | | |
|---|---|---|---|---|
| 3,969,674 A | * | 7/1976 | Tracey | 375/235 |
| 5,115,452 A | * | 5/1992 | Cupo | 375/232 |
| 5,222,101 A | * | 6/1993 | Ariyavisitakul et al. | 375/231 |
| 5,841,816 A | * | 11/1998 | Dent et al. | 375/331 |
| 6,687,292 B1 | * | 2/2004 | Garcia | 375/235 |
| 7,031,382 B2 | * | 4/2006 | Hessel et al. | 375/229 |
| 7,277,493 B2 | * | 10/2007 | Lai | 375/260 |

* cited by examiner

*Primary Examiner* — Chieh M Fan
*Assistant Examiner* — Sophia Vlahos
(74) *Attorney, Agent, or Firm* — Ronald O. Neerings; Wade James Brady, III; Frederick J. Telecky, Jr.

(57) ABSTRACT

A novel and useful apparatus for and method of nonlinear adaptive phase domain equalization for multilevel phase coded demodulators. The invention improves the immunity of phase-modulated signals (PSK) to intersymbol interference (ISI) such as caused by transmitter or receiver impairments, frequency selective channel response filtering, timing offset or carrier frequency offset. The invention uses phase domain signals (r, θ) rather than the classical Cartesian quadrature components (I, Q) and employs a nonlinear adaptive equalizer on the phase domain signal. This results in significantly improved ISI performance which simplifies the design of a digital receiver.

24 Claims, 6 Drawing Sheets

NONLINEAR ADAPTIVE PHASE DOMAIN EQUALIZATION FOR MULTILEVEL PHASE CODED DEMODULATORS

FIELD OF THE INVENTION

The present invention relates to the field of data communications and more particularly relates to an apparatus for and method of nonlinear adaptive phase domain equalization for multilevel phase coded demodulators.

BACKGROUND OF THE INVENTION

Phase modulation communications is well known in the art. Phase modulation is a form of modulation that represents information to be conveyed as variations in the instantaneous phase of a carrier wave. Intersymbol interference (ISI) is a form of distortion of a signal whereby symbols transmitted before and after the current symbol in a close neighborhood to it have an effect on the currently received symbol. This is an unwanted phenomenon as the neighboring symbols contribute to a noise effect, making communications less reliable. Several approaches to fight against intersymbol interference include using adaptive equalization or error correcting codes (i.e. especially soft-decoding using the Viterbi algorithm).

ISI is usually caused by echoes or a nonlinear frequency response of the channel. It is introduced in wireless communication links using phase modulated schemes, by the channel or by the receiver implementation impairments. The ISI creates an error vector magnitude (EVM) floor which degrades overall performance of the demodulator. Note that in the case where the modulation is a differential like 8-DPSK, ISI creates the DEVM floor. In certain modulation schemes such as Bluetooth enhanced data rate (EDR), the receiver often utilizes a filtering scheme which filters the required channel before the demodulation step (after down conversion). The complexity of the filter determines the amount of ISI observed at its output. Thus, when a less complex filter (in terms of area and power) is in use, so further ISI will be introduced. Furthermore, in case there is a frequency offset of the down converted signal prior to the filter, the ISI is more severe since the filter is generally designed under the assumption of zero frequency offset, due to the fact that the frequency offset is unknown during the filter design phase. Any frequency offset in the timing recovery loop contributes to ISI as well.

THE ISI PROBLEM AND PRIOR ART TECHNIQUES

Current prior art wireless communication devices and standards make wide use of different Multilevel Phase-Shift Keying (M-PSK) and Differential Phase Shift Keying (D-PSK) modulation schemes to implement low complexity modulator and demodulator systems. This allows the design of a simple and low cost transceiver that can assure robust mitigation versus impairments usually introduced by low cost RF design. Applications like Bluetooth Enhanced Data Rate (EDR), ZigBee, WiBree, IS95 and EDGE utilize Multi-Level PSK and Multilevel DPSK as their transmission scheme.

A high level block diagram of an example prior art scheme of an MPSK (or MDPSK) transmission path is shown in FIG. 1. The transmission path, generally referenced 10, comprises a differential mapper 12, square root raised cosine filter (SRRC) filters for 114 and Q 20, I and Q mixers 16 and 18, respectively, local oscillator (LO) 22, summer 24, power amplifier 26 and antenna 28.

Multilevel PSK transmission scheme uses the signal phase measured every symbol duration to indicate the one or more information bits (referred to as a 'symbol' in the case of multilevel PSK). For Multilevel PSK modulation (sometimes referred to as M-ary modulation wherein M represents the number of bits per symbol), the binary data stream $\{b_n\}$, n-1, 2, 3, ... N, is mapped onto a corresponding sequence $\{S_k\}$, k=1, 2, ... N/log$_2$(M) of complex valued signal points as follows:

$$S_k = S_0 e^{j\phi_k} \; k=1,2,\ldots N/\log_2(M)$$

$$S_0 = e^{j\phi} \text{ with } \phi \in [0, 2\pi] \quad (1)$$

wherein
$S_k$ is the binary stream sequence at time k;
$S_0$ is the binary stream sequence at time 0.

The MPSK modulator usually employs square-root raised cosine pulse shaping technique or other pulse shaping techniques to achieve high out-of-band frequency efficiency and to generate the equivalent low pass information bearing signal v(t). The low pass equivalent information bearing signal v(t) is generated according to the following equation $$v(t) = \sum_k S_k p(t - kT) \quad (2)$$

wherein
v(t) denotes the low pass information bearing signal;
T denotes the symbol period T;
The output v(t) of the baseband modulator is then upconverted to the RF or IF frequency using the following expression $$s(t) = Re[v(t) e^{j 2\pi f_c t}] \quad (3)$$

Multilevel Differential PSK (MDPSK) transmission schemes use similar signal processing procedures as with the M-PSK modulation scheme described hereinabove. In the differential PSK modulation scheme, the data stream $\{b_n\}$, n=1,2,3, ... N, is not mapped onto a corresponding sequence $\{S_k\}$, k=1,2, ... N/log$_2$(M) of complex valued signal points. For instance, in case of Bluetooth EDR, where a symbol duration is 1 μsec, M=4 represents a bit rate of 2 Mbps and M=8 represents 3 Mbps. Gray coding is sometimes applied as well. The signal points $S_k$ are defined by the following:

$$S_k = S_{k-1} e^{j\phi_k} \; k=1,2,\ldots N/\log_2(M)$$

$$S_0 = e^{j\phi} \text{ with } \phi \in [0, 2\pi] \quad (4)$$

The relationship between the binary input $b_k$ and the phase $\phi_k$ is of a differential nature. An example of this relationship is presented in the case of Bluetooth EDR as shown in Tables 1 and 2 below.

TABLE 1

π/4-DQPSK mapping for Bluetooth EDR1 (M = 4)

| $B_{2k-1}$ | $B_{2k}$ | $\phi_k$ |
|---|---|---|
| 0 | 0 | π/4 |
| 0 | 1 | 3π/4 |
| 1 | 1 | −3π/4 |
| 1 | 0 | −π/4 |

TABLE 2

8DPSK mapping for Bluetooth EDR2 (M = 8)

| $B_{3k-2}$ | $B_{3k-1}$ | $B_{3k}$ | $\phi_k$ |
|---|---|---|---|
| 0 | 0 | 0 | 0 |
| 0 | 0 | 1 | $\pi/4$ |
| 0 | 1 | 1 | $\pi/2$ |
| 0 | 1 | 0 | $3\pi/4$ |
| 1 | 1 | 0 | $\pi$ |
| 1 | 1 | 1 | $-3\pi/4$ |
| 1 | 0 | 1 | $-\pi/2$ |
| 1 | 0 | 0 | $-\pi/4$ |

A high level block diagram of an example prior art scheme of an MPSK and MDPSK receive path is shown in FIG. 2. The receive path, generally referenced 30, comprises an antenna 32, low noise amplifier (LNA) 34, LO 40, I and Q mixers 36 and 38, respectively, analog to digital converters (ADCs) 42, 44, low pass filters (LPFs) 46, 48, baseband mixer 50 numerically controlled oscillator (NCO) 56, SRRC filters 52, 54 and demodulator 58 which may comprise angle generator 60 and decoder/slicer 62, as denoted by the dashed boxes.

Receivers and demodulators for M-PSK and M-DPSK transmission schemes often employ a downconversion to some IF frequency followed by filtering to select the desired channel. They also typically employ an additional filtering scheme that also functions as a matched filter to the pulse shaping filter used at the transmitter (i.e. in case of zero IF the channel select filter and the matched filter are typically combined). The output quadrature components (i.e. namely I and Q) of this matched filtered are used by the demodulator which may extract the phase $\hat{\theta}$ from the incoming signal.

The demodulator generates the estimated data bit streams $\hat{b}_k$ by matching the received symbols to the best fit symbol in accordance with the particular modulation scheme employed. In the case of an M-PSK modulated signal, the signal phase is compared to all possible phase options as dictated by the modulator. The phase selected is the phase that yields the minimum Euclidian distance to the received phase (i.e. has the maximum likelihood). This process is often denoted as 'slicing.' In the case of an M-DPSK signal, the 'slicer' utilizes the phase difference signal $\Delta\theta_k = \theta_k - \theta_{k-1}$ at each symbol duration. These phase differences (i.e. $\Delta\theta_k$) are than compared to all possible phase differences and a selection is made is accordance with the best fitting result (i.e. the phase different that yields the minimum Euclidian distance or maximum likelihood).

Due to the memory properties of linear invariant filters in both transmit and receive paths, however, a certain noise 'cloud' is introduced at the demodulator output. This noise cloud is often referred as ISI. The ISI is highly dependent on the complexity of the filter, in particular the number of coefficients and number of bits. The higher the complexity of the filter, the lower the ISI noise that is introduced. It is noted that ISI is an interference that is added to the thermal noise and results in degraded receiver sensitivity since more effective noise is introduced at the input to the slicer.

The ISI noise is made worse when a carrier frequency offset is introduced at the receiver or when inaccuracies in timing recovery are present. Carrier frequency offset is a typical perturbation caused by impairments in the Automatic Frequency Correction (AFC) mechanism incorporated in most RF receivers. As a result of residual carrier frequency offset, the signal is not centered around the expected IF frequency (or baseband). This non-centered signal is then fed through sharp receive filters which were designed for receive signals with no frequency offset.

Therefore, even if the receive filters were ideal (i.e. they introduce minimum ISI due to their high complexity), there still remains a certain amount of interference. The timing phase offset estimation inaccuracy subsequently produced causes a certain offset at the point in which the phase (or differential phase) is sampled at the slicer input. Such an offset causes ISI in accordance with the shaping filter used during the modulation and demodulation of the signal. The bigger the offset is, the more severe the ISI will be.

In order to minimize the ISI noise, prior art receive filters are typically designed with complex receive filters and AFC mechanisms. In addition, highly accurate timing recovery loops are also used to combat ISI. Although these approaches may be somewhat effective in combating ISI, they have the disadvantage of significantly increasing the size of the required circuits and hence their cost.

Adaptive equalization is another prior art approach used to mitigate ISI. Adaptive equalizers are applied to the quadrature (i.e. Cartesian) components, i.e. typically on the baseband components of I and Q. This is mainly due to the fact that the ISI has a relatively simple mathematical representation in Cartesian form. For M-PSK and M-DPSK modulation schemes, however, it is problematic to close the adaptation loop based on the captured residual error. This is due to the large delays involved in the calculation of the residual error which is required to serve as an error indication for the adaptation rules of the equalizer.

It is thus desirable to have an equalization mechanism that does not suffer from the disadvantages of the prior art ISI mitigation techniques. The equalization mechanism should be capable of mitigating ISI in phase modulated signals. In addition, the equalization mechanism should be adaptive and be able to improve the immunity of phase modulated signals for use with multilevel phase coded demodulators.

SUMMARY OF THE INVENTION

The present invention is a novel and useful apparatus for and method of nonlinear adaptive phase domain equalization for multilevel phase coded demodulators. The invention improves the immunity of phase-modulated signals (PSK) to intersymbol interference (ISI) such as caused by transmitter or receiver impairments, frequency selective channel response filtering, timing offset or carrier frequency offset. The invention uses phase domain signals (r, θ) rather than the classical Cartesian quadrature components (I, Q) and employs a nonlinear adaptive equalizer on the phase domain signal. This results in significantly improved ISI performance which simplifies the design of a digital receiver.

Thus, the invention provides a nonlinear phase domain equalization mechanism to eliminate the ISI present at the receiver for M-PSK and M-DPSK modulation schemes. The mechanism employs an adaptive nonlinear equalizer that operates in the phase domain thus simplifying the equalization process and ensures mitigation of the effects of ISI. The phase domain equalization allows much lower integrated circuit (IC) area and power filtering schemes and mitigates demodulator impairments such as carrier frequency offset and timing phase error. Use of the phase domain equalization scheme allows simpler and lower cost implementation of digital demodulators for M-PSK and M-DPSK modulation.

The nonlinear adaptive phase domain equalization mechanism is applicable for any wired or wireless communication standard that uses phase modulated signals. Examples of several such wireless communication standards include, but are not limited to, Bluetooth EDR, ZigBee, WiBree, GSM EDGE, etc. In general, the mechanism of the invention is applicable to any phase coded modulation based system such as M-PSK, M-DPSK, MFSK, CPM, MSK, GMSK, etc. The invention is capable of providing 5 to 20 dB in improvements in effective ISI mitigation at the decision unit (i.e. slicer) in the receiver.

Although the adaptive phase domain equalizer of the present invention can be incorporated in numerous types of wireless or wired communication devices such a multimedia player, mobile station, cellular phone, PDA, DSL modem, WPAN device, etc., it is described in the context of a Bluetooth EDR based communication device. It is not intended, however, that the invention will be limited to the example applications and embodiments presented. It is appreciated that one skilled in the art can apply the principles of the present invention to many other types of communication systems well-known in the art without departing from the spirit and scope of the invention. In addition, the principles of the invention can be applied to other wireless or wired standards and is applicable wherever there is a need to mitigate the effects of ISI in communications systems employing phase coded modulation.

Advantages of the nonlinear adaptive phase domain equalization mechanism include (1) the applicability of the mechanism to any phase coded modulation (e.g., M-PSK, M-DPSK, MFSK, CPM, MSK, GMSK, etc.); (2) lower cost and size of the digital radio design incorporating the invention, especially when employing signal processing the (r, θ) space; (3) improved receiver robustness when using phase coded modulation; (4) simplifies the design of receive chain analog and digital filters; (5) mitigates prior art receiver error-floor caused by carrier frequency offset; and (6) mitigates prior art receiver error-floor caused by timing recovery inaccuracies.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application. Specific Integrated Circuit (ASIC) or Field Programmable Gate Array (FPGA), or as functionally equivalent discrete hardware components.

There is thus provided in accordance with the invention, a method of reducing the effect of intersymbol interference (ISI) on phase modulated signals, the method comprising the steps of adaptively estimating the ISI of a phase domain representation of an input symbol stream and subtracting the estimated ISI from the input phase modulated symbols to yield an equalizer output thereby.

There is also provided in accordance with the invention, a nonlinear phase domain equalizer comprising estimation means for estimating the intersymbol interference (ISI) of phase domain representation of an input symbol stream, the estimation means comprising means for calculating cosine and sine values of each input symbol, a filter operative to filter the cosine and sine values of the input symbols to yield an ISI estimate therefrom and means for subtracting the ISI estimate from the input symbols to yield an equalizer output therefrom.

There is further provided in accordance with the invention, a nonlinear phase domain equalizer comprising estimation means for estimating intersymbol interference (ISI) of a phase domain representation of an input symbol stream, the estimation means comprising means for calculating cosine and sine values of each input symbol, a finite impulse response (FIR) filter operative to filter the cosine and sine values of the input symbols in accordance with a plurality of filter tap coefficients to yield an ISI estimate therefrom, means for subtracting the ISI estimate from the input symbols to yield an equalizer output therefrom, a slicer operative to slice the equalizer output to yield a sliced output therefrom and update means for updating the plurality of filter tap coefficients as a function of slicer error and the input symbols.

There is also provided in accordance with the invention, a method of phase domain equalization, the method comprising the steps of estimating the intersymbol interference (ISI) of phase domain representation of an input symbol stream by filtering the cosine and sine of each input symbol in accordance with a plurality of filter tap coefficients to yield an ISI estimate therefrom, subtracting the ISI estimate from the input symbols to yield an equalizer output therefrom, slicing the equalizer output to yield a sliced output therefrom and updating the plurality of filter tap coefficients as a function of slicer error and the input symbols.

There is further provided in accordance with the invention, a mobile communications device comprising a radio comprising a transmitter and receiver, the receiver comprising a nonlinear phase domain equalizer, the equalizer comprising estimation means for estimating intersymbol interference (ISI) of a phase domain representation of an input symbol stream received by the radio receiver, the estimation means comprising means for calculating cosine and sine values of each input symbol, means for filtering the cosine and sine values of the input symbols to yield an ISI estimate therefrom, means for subtracting the ISI estimate from the input symbols to yield an equalizer output therefrom and a demodulator operative to demodulate the equalizer output to yield an output symbol stream thereby.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
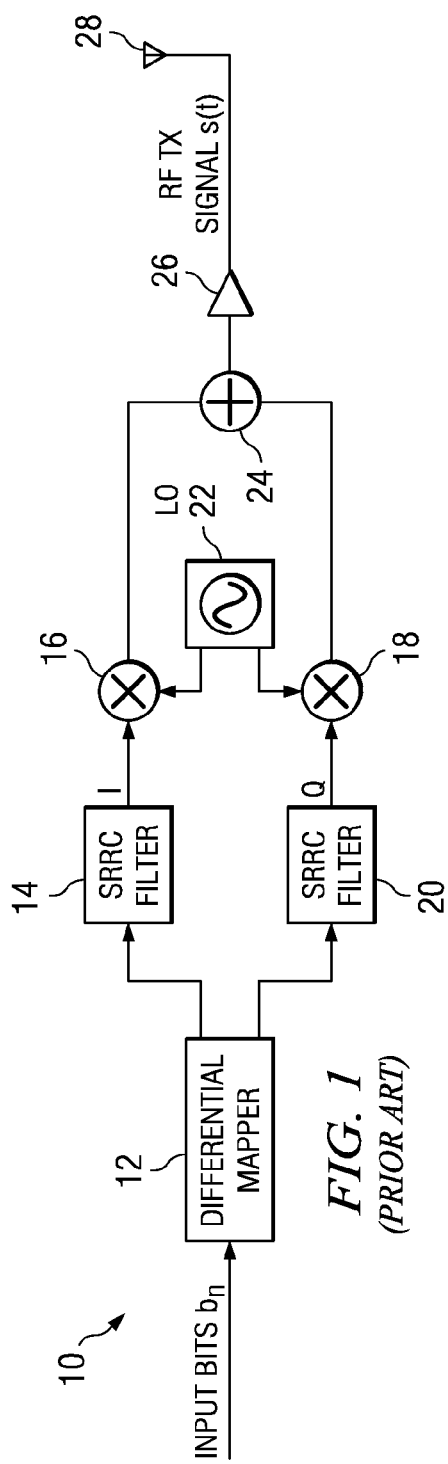
FIG. 1 is a high level block diagram of an example prior art scheme of an MPSK and MDPSK transmission path.
Figure 2:
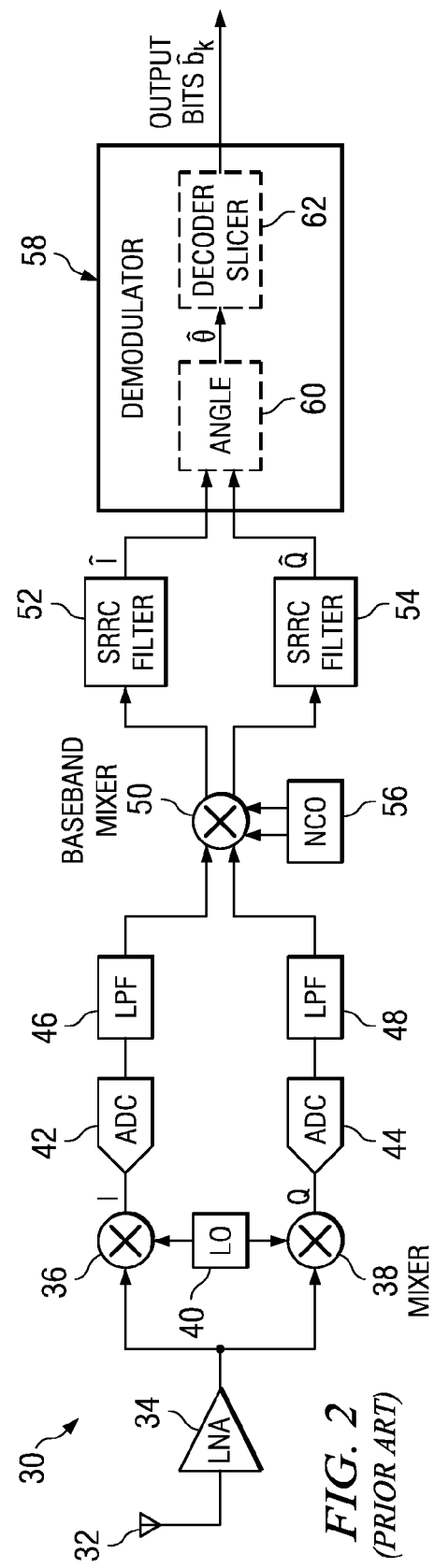
FIG. 2 is a high level block diagram of an example prior art scheme of an MPSK and MDPSK receive path.

The following notation is used throughout this document.

| Term | Definition |
|---|---|
| AC | Alternating Current |
| ADC | Analog to Digital Converter |
| AFC | Automatic Frequency Control |
| ASIC | Application Specific Integrated Circuit |
| AVI | Audio Video Interleave |
| AWGN | Additive White Gaussian Noise |
| BMP | Windows Bitmap |
| C/I | Carrier to Interferer Ratio |
| CFO | Carrier Frequency Offset |
| CPM | Continuous Phase Modulation |
| CPU | Central Processing Unit |
| DAC | Digital to Analog Converter |
| DC | Direct Current |
| DEVM | Differential Error Vector Magnitude |
| DPSK | Differential Phase Shift Keying |
| DSL | Digital Subscriber Line |
| DSP | Digital Signal Processor |
| EDGE | Enhanced Data Rates for GSM Evolution |
| EDR | Enhanced Data Rate |
| EPROM | Erasable Programmable Read Only Memory |
| EVM | Error Vector Magnitude |
| FIR | Finite Impulse Filter |
| FM | Frequency Modulation |
| FPGA | Field Programmable Gate Array |
| GMSK | Gaussian Minimum Shift Keying |
| GPS | Global Positioning System |
| GSM | Global System for Mobile communications |
| HDL | Hardware Description Language |
| IC | Integrated Circuit |
| IEEE | Institute of Electrical and Electronics Engineers |
| IF | Intermediate Frequency |
| ISI | Intersymbol Interference |
| JPG | Joint Photographic Experts Group |
| LAN | Local Area Network |
| LMS | Least Mean Squares |
| LNA | Low Noise Amplifier |
| LO | Local Oscillator |
| LPF | Low Pass Filter |
| MBOA | Multiband OFDM Alliance |
| M-DPSK | M-ary Differential Phase-Shift Keying |
| MFSK | Multiple-Frequency Shift Keying |
| MP3 | MPEG-1 Audio Layer 3 |
| MPG | Moving Picture Experts Group |
| M-PSK | M-ary Phase-Shift Keying |
| MSK | Minimum Shift keying |
| NCO | Numerically Controller Oscillator |
| OFDM | Orthogonal Frequency Division Multiplexing |
| PA | Power Amplifier |
| PC | Personal Computer |
| PDA | Portable Digital Assistant |
| PSK | Phase Shift Keying |
| RAM | Random Access Memory |
| RF | Radio Frequency |
| ROM | Read Only Memory |
| SIM | Subscriber Identity Module |
| SNR | Signal to Noise Ratio |
| SRRC | Square Root Raised Cosine |
| TV | Television |
| USB | Universal Serial Bus |
| UWB | Ultra Wideband |
| WiFi | Wireless Fidelity |
| WiMAX | Worldwide Interoperability for Microwave Access |
| WiMedia | Radio platform for UWB |
| WLAN | Wireless Local Area Network |
| WMA | Windows Media Audio |
| WMV | Windows Media Video |
| WPAN | Wireless Personal Area Network |

DETAILED DESCRIPTION OF THE INVENTION

The present invention is a novel and useful apparatus for and method of nonlinear adaptive phase domain equalization for multilevel phase coded demodulators. The invention improves the immunity of phase-modulated signals (PSK) to intersymbol interference (ISI) such as caused by transmitter or receiver impairments, frequency selective channel response filtering, timing offset or carrier frequency offset. The invention uses phase domain signals (r, θ) rather than the classical Cartesian quadrature components (I, Q) and employs a nonlinear adaptive equalizer on the phase domain signal. This results in significantly improved ISI performance which simplifies the design of a digital receiver.

Thus, the invention provides a nonlinear phase domain equalization mechanism to eliminate the ISI present at the receiver for M-PSK and M-DPSK modulation schemes. The mechanism employs an adaptive nonlinear equalizer that operates in the phase domain thus simplifying the equalization process and ensures mitigation of the effects of ISI. The phase domain equalization allows much lower integrated circuit (IC) area and power filtering schemes and mitigates demodulator impairments such as carrier frequency offset and timing phase error. Use of the phase domain equalization scheme allows simpler and lower cost implementation of digital demodulators for M-PSK and M-DPSK modulation.

Although the packet detection mechanism of the present invention can be incorporated in numerous types of wireless or wired communication devices such a multimedia player, mobile station, cellular phone, PDA, DSL modem, WPAN device, etc., it is described in the context of a Bluetooth EDR based communication device. It is not intended, however, that the invention will be limited to the example applications and embodiments presented. It is appreciated that one skilled in the art can apply the principles of the present invention to many other types of communication systems well-known in the art without departing from the spirit and scope of the invention. In addition, the principles of the invention can be applied to other wireless or wired standards and is applicable wherever there is a need to mitigate the effects of ISI in communications systems employing phase coded modulation.

Note that throughout this document, the term communications transceiver or communications device is defined as any apparatus or mechanism adapted to transmit, receive or transmit and receive data through a medium. The communications device or communications transceiver may be adapted to communicate over any suitable medium, including wireless or wired media. Examples of wireless media include RF, infrared, optical, microwave, UWB, Bluetooth, WiMAX, WiMedia, WiFi, or any other broadband medium, etc. Examples of wired media include twisted pair, coaxial, optical fiber, any wired interface (e.g., USB, Firewire, Ethernet, etc.). The term Ethernet network is defined as a network compatible with any of the IEEE 802.3 Ethernet standards, including but not limited to 10Base-T, 100Base-T or 1000Base-T over shielded or unshielded twisted pair wiring. The terms communications channel, link and cable are used interchangeably.

The term multimedia player or device is defined as any apparatus having a display screen and user input means that is capable of playing audio (e.g., MP3, WMA, etc.), video (AVI, MPG, WMV, etc.) and/or pictures (JPG, BMP, etc.). The user input means is typically formed of one or more manually operated switches, buttons, wheels or other user input means. Examples of multimedia devices include pocket sized personal digital assistants (PDAs), personal media player/recorders, cellular telephones, handheld devices, and the like.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention can take the form of an entirely hardware embodiment, an entirely software embodiment or an embodiment containing a combination of hardware and software elements. In one embodiment, a portion of the mechanism of the invention is implemented in software, which includes but is not limited to firmware, resident software, object code, assembly code, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium is any apparatus that can contain, store, communicate, propagate, or transport the program for use by or in connection with the instruction execution system, apparatus, or device, e.g., floppy disks, removable hard drives, computer files comprising source code or object code, flash semiconductor memory (USB flash drives, etc.), ROM, EPROM, or other semiconductor memory devices.

Mobile Device/Cellular Phone/PDA System

Figure 3:
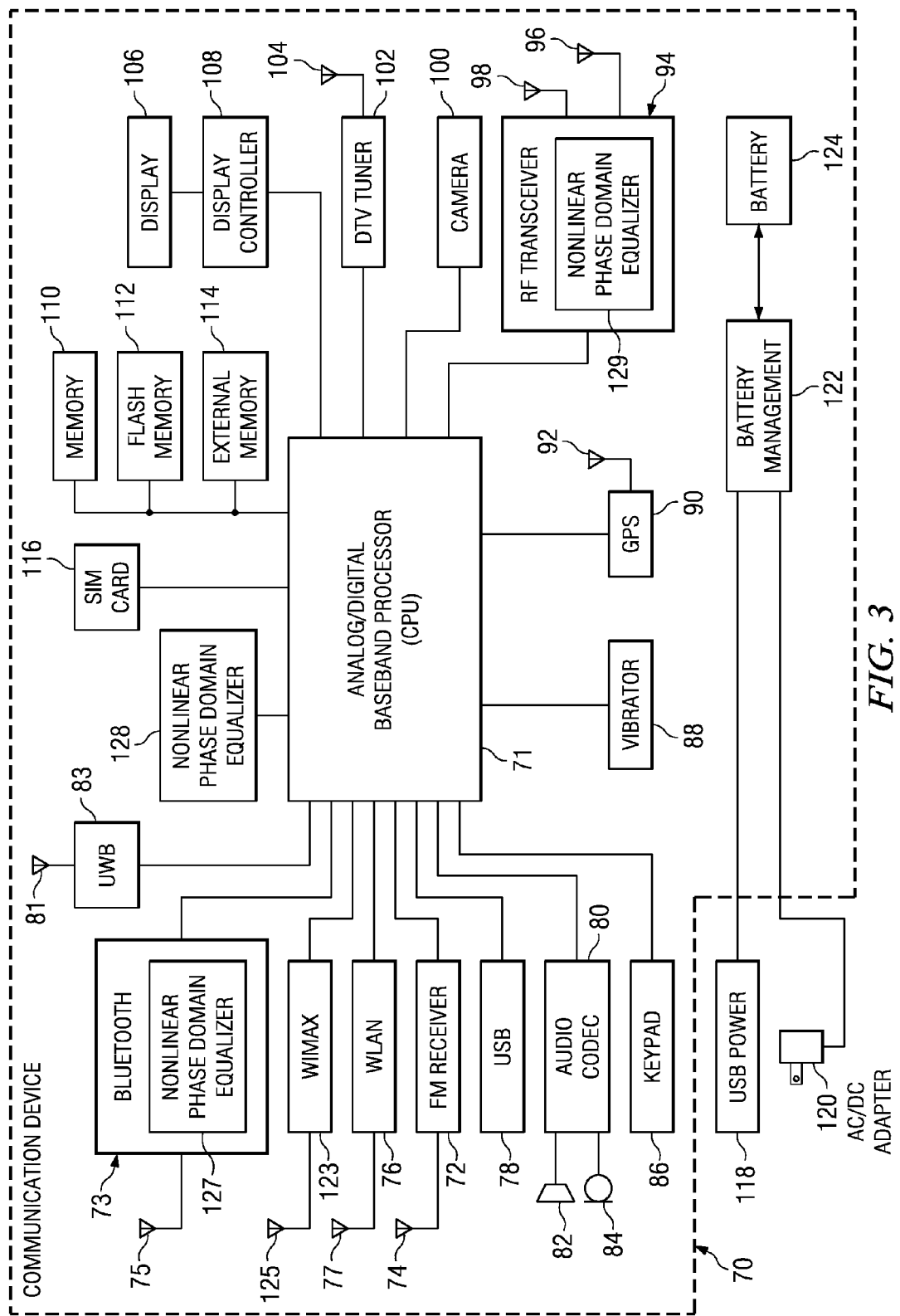
FIG. 3 is a simplified block diagram illustrating an example communication device incorporating the nonlinear phase domain equalizer of the present invention.

A block diagram illustrating an example communication device incorporating the nonlinear phase domain equalizer of the present invention is shown in FIG. 3. The communication device may comprise any suitable wired or wireless device such as a multimedia player, mobile station, mobile device, cellular phone, PDA, wireless personal area network (WPAN) device, Bluetooth EDR device, etc. For illustration purposes only, the communication device is shown as a Bluetooth EDR enabled cellular phone or smart phone. Note that this example is not intended to limit the scope of the invention as the phase domain equalization mechanism of the present invention can be implemented in a wide variety of wireless and wired communication devices.

The cellular phone, generally referenced 70, comprises a baseband processor or CPU 71 having analog and digital portions. The basic cellular link is provided by the RF transceiver 94 and related one or more antennas 96, 98. Depending on the implementation, the RF transceiver may incorporate the nonlinear phase domain equalizer 129 of the present invention, described in more detail infra. A plurality of antennas is used to provide antenna diversity which yields improved radio performance. The cell phone also comprises internal RAM and ROM memory 110, Flash memory 112 and external memory 114.

Several user interface devices include microphone 84, speaker 82 and associated audio codec 80, a keypad for entering dialing digits 86, vibrator 88 for alerting a user, camera and related circuitry 100, a TV tuner 102 and associated antenna 104, display 106 and associated display controller 108 and GPS receiver and associated antenna 92.

A USB interface connection 78 provides a serial link to a user's PC or other device. An FM receiver 72 and antenna 74 provide the user the ability to listen to FM broadcasts. WLAN radio and interface 76 and antenna 77 provide wireless connectivity when in a hot spot or within the range of an ad hoc, infrastructure or mesh based wireless LAN network. A Bluetooth EDR radio and interface 73 and antenna 75 provide Bluetooth wireless connectivity when within the range of a Bluetooth wireless network. In accordance with the invention, the Bluetooth EDR radio comprises the nonlinear phase domain equalizer 127 of the present invention, described in more detail infra. Further, the communication device 70 may also comprise a WiMAX radio and interface 123 and antenna 125. SIM card 116 provides the interface to a user's SIM card for storing user data such as address book entries, etc.

The communication device 70 also comprises an Ultra Wideband (UWB) radio and interface 83 and antenna 81. The UWB radio typically comprises an MBOA-UWB based radio. A nonlinear phase domain equalizer block 128 is operative to implement the nonlinear phase domain equalization mechanism of the present invention, described in more detail infra. In operation, the nonlinear phase domain equalizer block 128 may be implemented as hardware, software executed as a task on the baseband processor 71 or a combination of hardware and software. Implemented as a software task, the program code operative to implement the phase domain equalization mechanism of the present invention is stored in one or more memories 110, 112 or 114.

Portable power is provided by the battery 124 coupled to battery management circuitry 122. External power is provided via USB power 118 or an AC/DC adapter 120 connected to the battery management circuitry which is operative to manage the charging and discharging of the battery 124.

Example Bluetooth Radio Incorporating Phase Domain Equalizer

Figure 4:
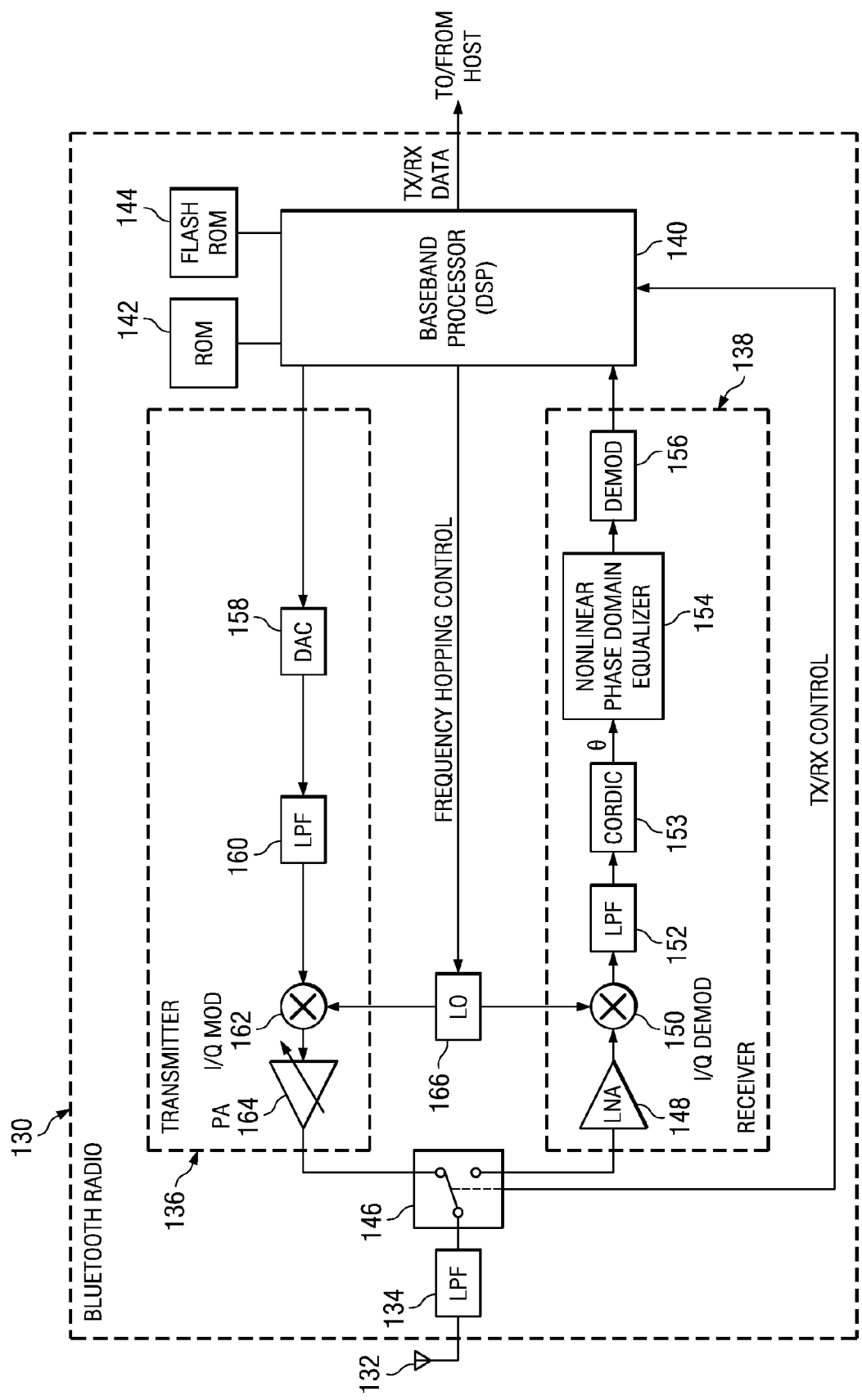
FIG. 4 is a block diagram illustrating an example Bluetooth radio incorporating the nonlinear phase domain equalizer of the present invention.

A block diagram illustrating an example Bluetooth radio incorporating the nonlinear phase domain equalizer of the present invention is shown in FIG. 4. The Bluetooth radio, generally referenced 130, comprises an antenna 132, band pass filter (BPF) 134, duplexer or TX/RX switch 146, transmitter path 136, receiver path 138, baseband processor 140, local oscillator (LO) 166, random access memory (RAM) 142 and Flash read only memory (ROM) 144.

The transmitter path 136 comprises a digital to analog converter (DAC) 158, low pass filter (LPF) 160, I/Q modulation mixer 162 and power amplifier (PA) 164. The receiver path 138 comprises low noise amplifier (LNA) 148, I/Q demodulation mixer 150, low pass filter (LPF) 152, CORDIC 153, nonlinear phase domain equalizer 154 and demodulator 156.

In operation, in the transmit direction, the digital symbols generated by the baseband processor (which may comprise a DSP or other computing platform) are converted to the analog domain by the DAC and then low pass filtered before being modulated via mixer 162. The mixer modulates the symbols with the local oscillator signal controlled by the frequency hopping control signal output of the baseband processor to upconvert the transmit signal to one of 79 Bluetooth channels. The upconverted signal is then amplified via PA 164 switch and then passed through the switch and filtered before being fed to the antenna.

In the receive direction, the signal received from the antenna is filtered and passed through the switch to the LNA 148 which amplifies the signal. The signal is then downconverted to baseband by mixing with the signal from the local oscillator 166. The resultant signal is filtered and undergoes Cartesian to angle conversion via CORDIC 153 or other equivalent circuit. The phase signal is then input to the nonlinear phase domain equalizer 154 of the present invention which functions to remove unwanted ISI from the receive signal. The equalizer output is then demodulated and input to the baseband processor.

Nonlinear Phase Domain Equalizer

The apparatus and methods of the equalization mechanism of the present invention are based on an observation that the ISI noise in the receive signal is highly dependent on the phase signal (or phase difference in case of M-DPSK) of the neighboring symbols, under some nonlinear transformation.

Figure 5:
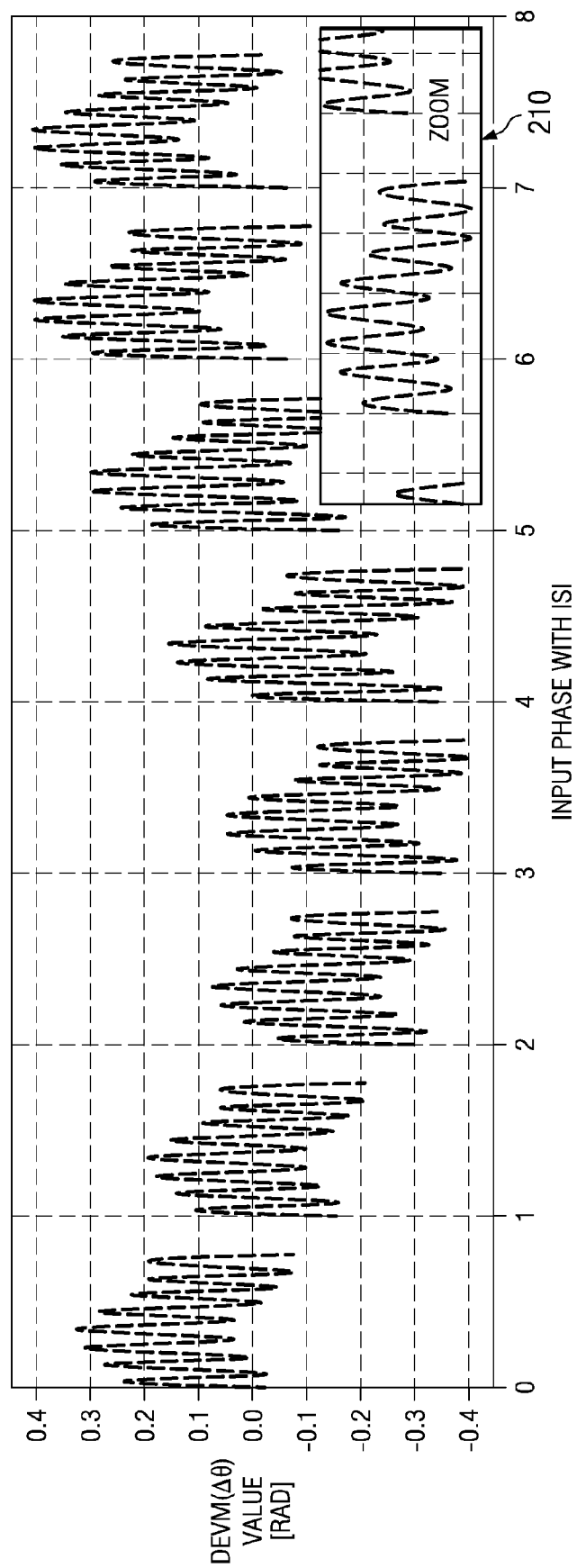
FIG. 5 is a graph illustrating the ISI dependence of $\Delta\phi$ in a D-8PSK receiver.

This dependency is illustrated in FIG. 5 which is a graph showing the ISI dependence on $\Delta\theta_r(k)$ as measured in DEVM in a 8DPSK receiver. The $\Delta\phi_r(k)$ represents the received phase difference at time instant k in an 8DPSK signal which is the phase with ISI at the output of the receiver matched filter. It can be seen from the Figure that the DEVM takes the form of a phase-shifted sine function. The invention takes advantage of this phenomenon by providing a mechanism for achieving equalization by the use of the sin and cos of $\Delta\theta_r(k)$.

Figure 6:
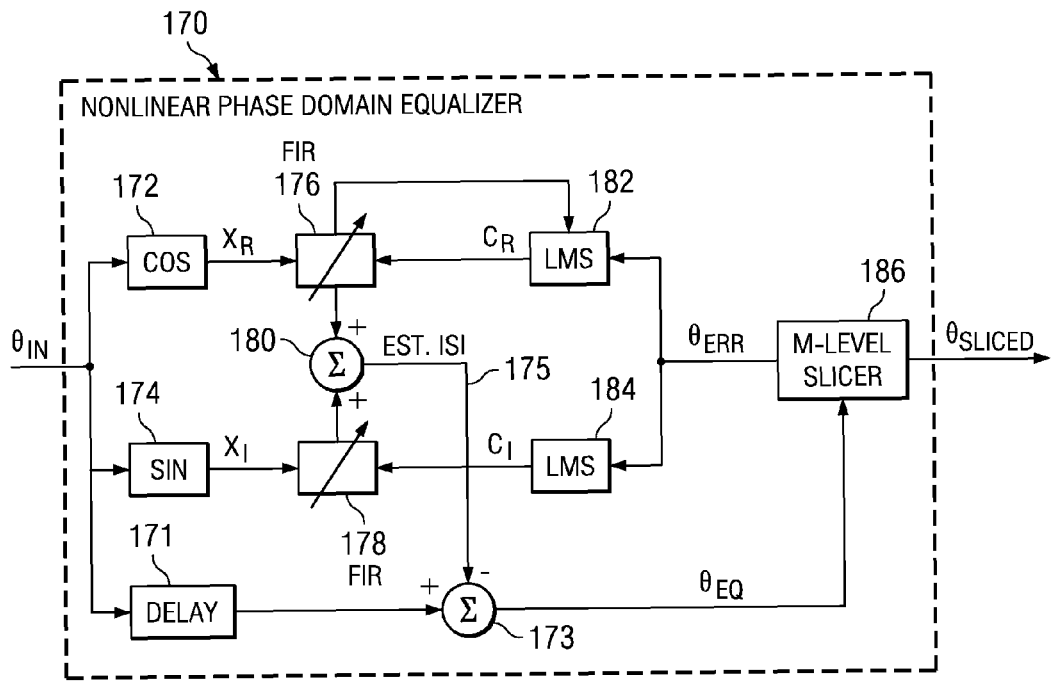
FIG. 6 is a block diagram illustrating an example embodiment of the nonlinear phase domain equalizer of the present invention.

Expressed in mathematical form, the ISI of $\Delta\theta r(k)$ can be approximated as $$Re\{\sum c_n e^{j\Delta\theta(k-n)}\} \quad (5)$$

wherein
$c_n$ denotes the amplitude of the sinusoidal components;
$\Delta\theta$ denotes the phase difference;
n is an index;

A block diagram illustrating an example embodiment of the nonlinear phase domain equalizer of the present invention is shown in FIG. 6. The nonlinear phase domain equalizer, generally referenced 170, comprises a cosine look up or generator 172, sine lookup or generator 174, finite impulse response (FIR) filters 176, 178, least mean square (LMS) blocks 182, 184, summer 180, delay block 171, subtractor 173 and M-level slicer 186.

In operation, equalization is performed by first estimating the ISI. The estimated ISI is calculated using an adaptive linear baud-spaced filter over the sin and cos of the $\theta_{IN}$ (i.e. $\Delta\theta(k)$). Real and imaginary values $X_R$, $X_I$ are generated by taking the cos and sin values of the $\theta_{IN}$ signal via cos and sin blocks 172, 174, respectively. The $x_R$ and $x_I$ signals are input to FIR filters 176, 178, respectively, which have configurable tap coefficients. The output of the FIR filters are summed to generate the estimated ISI signal 175. The FIR filter taps are updated using the LMS algorithm (steepest descent least mean squares algorithm).

The sine and cosine of each baud-spaced $\theta_{IN}$ (i.e. $\Delta\theta(k)$) are filtered via a finite impulse response (FIR) filter having configurable taps coefficients. The tap coefficients of the FIR filters are updated using the LMS algorithm. The sum of the results (i.e. the estimated ISI signal 175) is subtracted from the delayed $\Delta\theta(k)$ input via subtractor 173. Note that the $\Delta\theta(k)$ delay 171 is preferably aligned with the central tap of both FIR filters.

The equalizer output $\theta_{EQ}$ is then sliced in accordance with the particular modulation used. The slicer output symbols $\theta_{SLICER}$ are estimated by applying Gray Code encoding over the sliced decision. The slicer error $\theta_{ERROR}$, i.e. the difference between the slicer decision $\theta_{SLICER}$ and the its input $\theta_{EQ}$, as well as FIR filter input (sin and cos of $\Delta\theta$) are used in combination to update the tap coefficients of the FIR filters.

Figure 7:
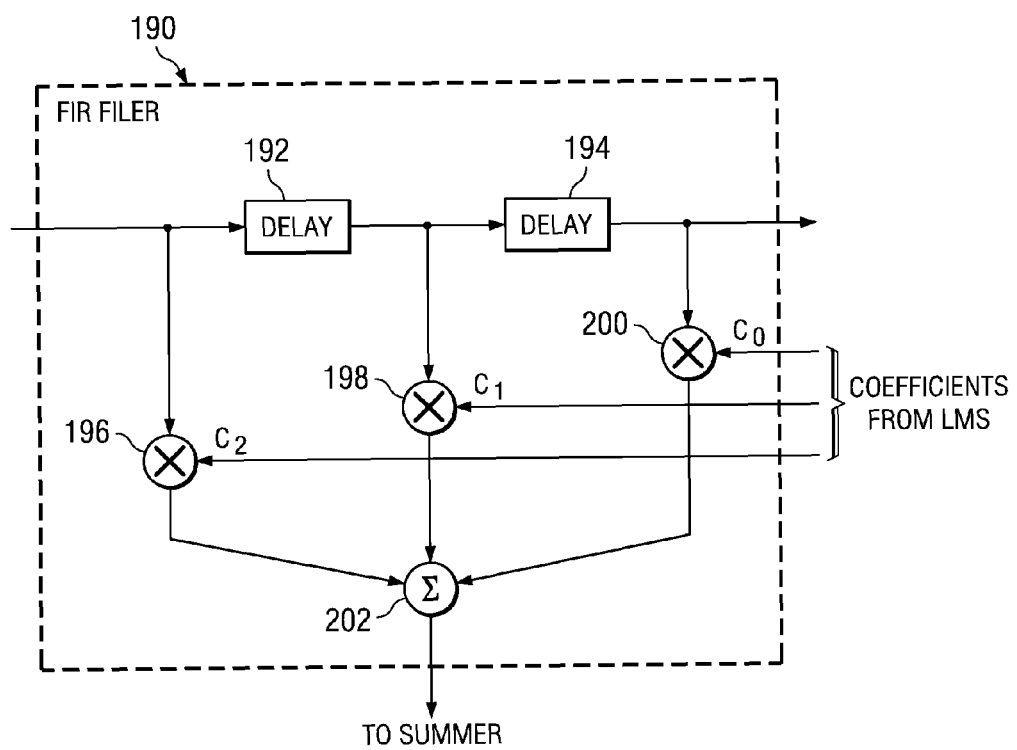
FIG. 7 is a block diagram illustrating the FIR filter of the equalizer of FIG. 6 in more detail.

A block diagram illustrating the FIR filter of the equalizer of FIG. 6 in more detail is shown in FIG. 7. The FIR filter, generally referenced 190, comprises a delay line comprising delay blocks 192 and 194, multipliers 196, 198, 200 and summer 202. In operation, the multipliers 196, 198, 200 are adapted to multiply the tapped delay inputs by coefficients $c_2, c_1, c_0$, respectively, provided by the LMS block. Note that both FIR filters 176, 178 are constructed as shown in FIG. 7. LMS 182 generates updated coefficients $c_R$ for FIR filter 176 filtering the $x_R$ signal and LMS 184 generates updated coefficients $c_I$ for FIR filter 178 filtering the $x_I$ signal. Note that any number of taps may be used wherein in the typical case, less than five taps are usually sufficient.

An LMS adaptation algorithm is implemented in blocks 182, 184 to converge the equalizer taps to optimum values. The tap coefficient updates can be represented by the following expression $$c_n = c_{n-1} + \mu \epsilon_n x_n \quad (6)$$

where
$c_n$ denotes a vector of filter taps at instant n;
$\epsilon_n$ denotes the slicer error at instant n;
$\mu$ denotes an adaptation coefficient or step size $\ll 1$;
$x_n$ denotes a vector of filter tap cumulates at instant n, i.e., filter input samples at instant n to n−L+1, where L is length of filter;

In operation, each tap coefficient is updated using its own current input sample and the slicer error common for all the taps. Thus, the expression in Equation 6 for tap number k of the filter can be reformulated for the real coefficients $c_R$ as follows $$c_n^R[k] = c_{n-1}^R[k] + \mu \epsilon_n \cos(\Delta\theta_{n-k}) \quad (7)$$

where
$c_n^R[k]$ denotes the value of the $k^{th}$ filter tap of the real part of a vector of complex filter taps at instant n;
$\mu$ denotes an adaptation coefficient;
$\epsilon_n$ denotes the slicer error at instant n;
$\Delta\theta_{n-k}$ denotes the phase inputs at time n delayed by the $k^{th}$ filter tap;
And for the imaginary coefficients $c_I$ is expressed as follows $$c_n^I[k] = c_{n-1}^I[k] + \mu \epsilon_n \sin(\Delta\theta_{n-k}) \quad (8)$$

where $c_n^R[k]$ denotes the value of the $k^{th}$ filter tap of the imaginary part of a vector of complex filter taps at instant n;

μ denotes an adaptation coefficient;

$\epsilon_n$ denotes the slicer error at instant n;

$\Delta\theta_{n-k}$ denotes the phase inputs at time n delayed by the $k^{th}$ filter tap;

The phase domain equalization mechanism of the invention uses the well-known LMS algorithm to converge the equalizer taps as it effectively generates the optimal least mean squares solution even in nonlinear systems. It is appreciated by one skilled in the art that the LMS adaptation algorithm is presented herein for example purposes and that other adaptation schemes are also suitable for use with the present invention as along they allow convergence to the correct tap coefficient values.

Simulation Examples

Figure 8:
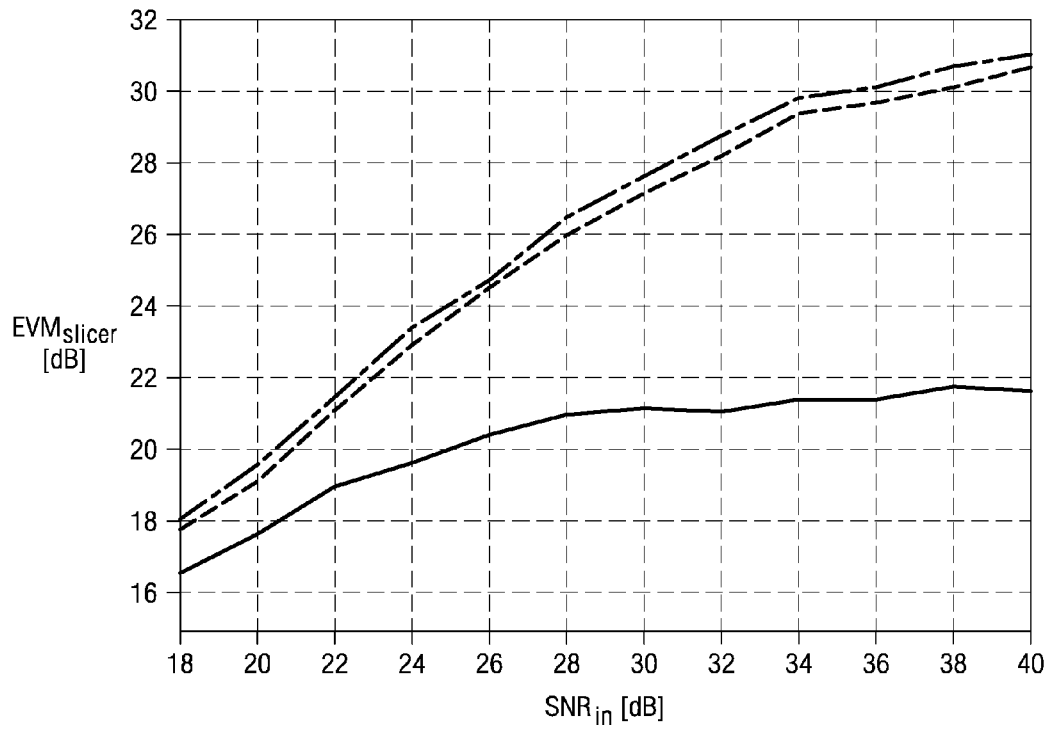
FIG. 8 is a graph illustrating the performance of the nonlinear phase domain equalizer of the present invention in 8-DPSK.

Several performance simulations highlighting the operation of the nonlinear phase domain equalizer of the present invention will now be presented. A graph illustrating the performance of the nonlinear phase domain equalizer of the present invention in 8-DPSK is shown in FIG. 8. The graph depicts an example of the performance of the proposed equalization scheme with a differentially coded 8-PSK modulated signal (e.g., a Bluetooth EDR signal). This Figure presents the error vector magnitude (EVM) at the slicer versus the SNR at the receiver input in an additive whiten Gaussian noise (AWGN) channel. The receiver also experiences ISI from the root raised cosine filtering by the matched filter.

The solid line represents the EVM with no equalizer. The dashed line represents the EVM using nonlinear phase domain equalizer with LMS adaptation as described supra. The dash-dot line represents the ideal case of optimal performance EVM (i.e. without ISI, using an ideal filtering scheme and with no frequency and timing errors). As can be seen from the graph, the performance with the equalizer is very close to that of the optimal case. When no equalizer is used in demodulation process, the EVM at the slicer is limited by the ISI, i.e. the ISI introduces a distortion equivalent to 22 dB of the carrier to interferer ratio (C/I). Thus, a receiver incorporating the non-linear equalizer of the present invention significantly outperforms a prior art receiver incorporating no equalization.

Figure 9:
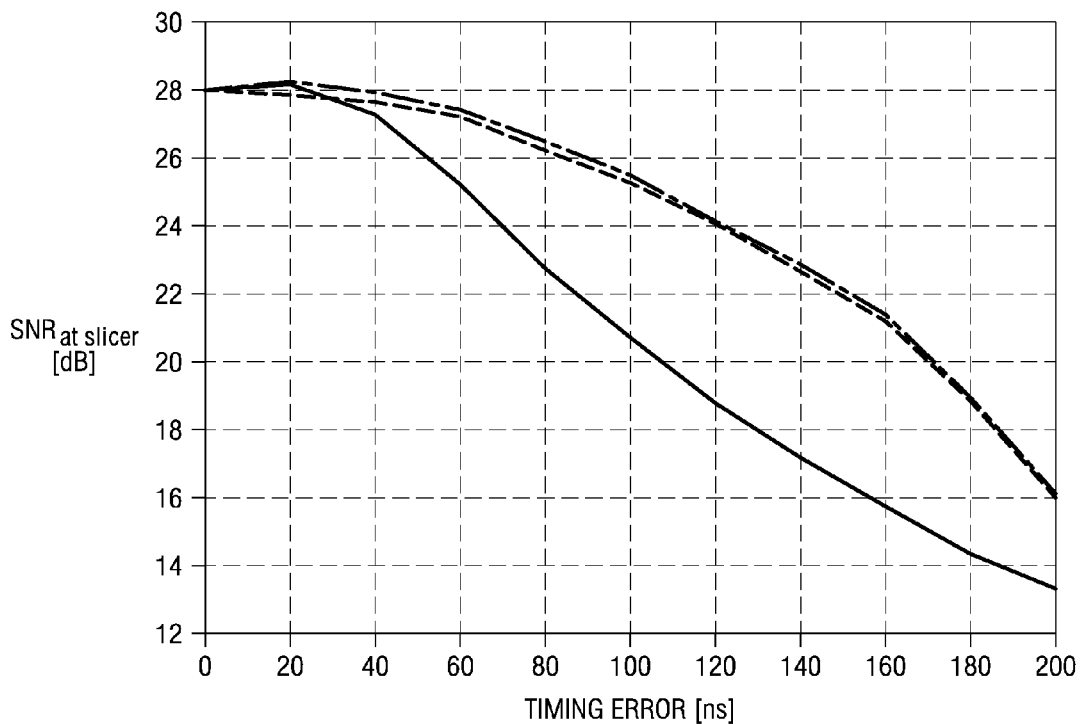
FIG. 9 is a graph illustrating the performance of the timing phase offset correction using the nonlinear phase domain equalizer of the present invention.

A graph illustrating the performance of the timing phase offset correction using the nonlinear phase domain equalizer of the present invention is shown in FIG. 9. This graph presents the performance of the timing phase offset correction using the nonlinear phase domain equalizer of the present invention on an example Bluetooth EDR signal having a symbol time of 1 μsec and an SNR at the input of 28 dB. In particular, the graph presents the SNR at the slicer versus the timing error in nanoseconds.

The solid line represents the SNR with no equalizer. The dashed line represents the SNR using the nonlinear phase domain equalizer with LMS adaptation as described supra. The dash-dot line represents the ideal case of optimal performance SNR (i.e. using an ideal filtering scheme that does not cause any ISI). As can be seen, the performance with the equalizer is very close to that of the optimal case. Thus, a receiver incorporating the non-linear equalizer of the present invention significantly improves the robustness of the receiver to timing recovery inaccuracies and allows the receiver to achieve near optimal performance in most cases.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of reducing the effect of intersymbol interference (ISI) on phase modulated signals, said method comprising the steps of:
    adaptively estimating the ISI of a phase domain representation of an input symbol stream; wherein said step of estimating comprises the steps of:
        calculating cosine and sine values of said phase domain input symbols;
        and filtering said cosine and sine values to yield said estimated ISI and
    subtracting said estimated ISI from said input phase modulated symbols to yield an equalizer output thereby.

2. The method according to claim 1, wherein said filtering comprises using a finite impulse response (FIR) filter.

3. A method of reducing the effect of intersymbol interference (ISI) on phase modulated signals, said method comprising the steps of:
    adaptively estimating the ISI of a phase domain representation of an input symbol stream, wherein said step of estimating comprises the steps of:
        filtering cosine and sine representations of said phase domain input symbols in accordance with a plurality of filter tap coefficients;
        slicing an equalizer output to generate sliced output symbols therefrom; and
        updating said plurality of filter tap coefficients as a function of slicer error values comprising a difference between a slicer output and said equalizer output; and
    subtracting said estimated ISI from said input phase modulated symbols to yield said equalizer output thereby.

4. A nonlinear phase domain equalizer, comprising:
    estimation means for estimating the intersymbol interference (ISI) of phase domain representation of an input symbol stream, said estimation means comprising:
        means for calculating cosine and sine values of each input symbol;
        a filter operative to filter said cosine and sine values of said input symbols to yield an ISI estimate therefrom; and
        means for subtracting said ISI estimate from said input symbols to yield an equalizer output therefrom.

5. The equalizer according to claim 4, further comprising:
    a slicer operative to slice said equalizer output to yield a sliced output therefrom; and
    means for updating filter tap coefficients in accordance with a slicer error and said input symbol stream.

6. The equalizer according to claim 5, wherein said means for updating is operative to implement a least means squares (LMS) adaptation algorithm to generate optimal equalizer tap coefficients.

7. The equalizer according to claim 4, wherein said filter comprises a finite impulse response (FIR) filter having a plurality of filter tap coefficients.

8. A nonlinear phase domain equalizer, comprising:
    estimation means for estimating intersymbol interference (ISI) of a phase domain representation of an input symbol stream, said estimation means comprising:
        means for calculating cosine and sine values of each input symbol;

a finite impulse response (FIR) filter operative to filter said cosine and sine values of said input symbols in accordance with a plurality of filter tap coefficients to yield an ISI estimate therefrom;

means for subtracting said ISI estimate from said input symbols to yield an equalizer output therefrom;

a slicer operative to slice said equalizer output to yield a sliced output therefrom; and update means for updating said plurality of filter tap coefficients as a function of slicer error and said input symbols.

9. The equalizer according to claim 8, wherein said slicer error comprises the difference between said sliced output and said equalizer output.

10. The equalizer according to claim 8, wherein said update means comprises means for implementing a least means squares (LMS) adaptation algorithm to converge said plurality of filter tap coefficients to optimal values.

11. The equalizer according to claim 8, wherein said update means comprises means for implementing a least means squares (LMS) adaptation algorithm represented by $$c_n = c_{n-1} + \mu \epsilon_n x_n$$

wherein $c_n$ denotes a vector of filter taps at instant n, $\epsilon_n$ denotes the slicer error at instant n, $\mu$ denotes an adaptation coefficient and $x_n$ denotes a vector of filter tap cumulates at instant n.

12. The equalizer according to claim 8, wherein said update means comprises means for implementing a least means squares (LMS) adaptation algorithm represented by $$c_n^R[k] = c_{n-1}^R[k] + \mu \epsilon_n \cos(\Delta \theta_{n-k})$$

wherein $c_n^R[k]$ denotes the value of the $k^{th}$ filter tap of the real part of a vector of complex filter taps at instant n, $\mu$ denotes an adaptation coefficient, $\epsilon_n$ denotes the slicer error at instant n, and $\Delta \theta_{n-k}$ denotes the phase inputs at time n delayed by the $k^{th}$ filter tap.

13. The equalizer according to claim 8, wherein said update means comprises means for implementing a least means squares (LMS) adaptation algorithm represented by $$c_n^I[k] = c_{n-1}^I[k] + \mu \epsilon_n \sin(\Delta \theta_{n-k})$$

wherein $c_n^I[k]$ denotes the value of the $k^{th}$ filter tap of the imaginary part of a vector of complex filter taps at instant n, $\mu$ denotes an adaptation coefficient, $\epsilon_n$ denotes the slicer error at instant n, and $\Delta \theta_{n-k}$ denotes the phase inputs at time n delayed by the $k^{th}$ filter tap.

14. A method of phase domain equalization, said method comprising the steps of:

estimating the intersymbol interference (ISI) of phase domain representation of an input symbol stream by filtering the cosine and sine of each input symbol in accordance with a plurality of filter tap coefficients to yield an ISI estimate therefrom;

subtracting said ISI estimate from said input symbols to yield an equalizer output therefrom;

slicing said equalizer output to yield a sliced output therefrom; and updating said plurality of filter tap coefficients as a function of slicer error and said input symbols.

15. The method according to claim 14, wherein said slicer error comprises the difference between said sliced output and said equalizer output.

16. The method according to claim 14, wherein said step of updating comprises implementing a least means squares (LMS) adaptation algorithm to converge said plurality of filter tap coefficients to optimal values.

17. The method according to claim 14, wherein said step of updating comprises implementing a least means squares (LMS) adaptation algorithm represented by $$c_n = c_{n-1} + \mu \epsilon_n x_n$$

wherein $c_n$ is a vector of filter taps at instant n, $\epsilon_n$ is the slicer error at instant n, $\mu$ represents an adaptation coefficient and $x_n$ is a vector of filter tap cumulates at instant n.

18. The method according to claim 14, wherein said step of updating comprises implementing a least means squares (LMS) adaptation algorithm represented by $$c_n^R[k] = c_{n-1}^R[k] + \mu \epsilon_n \cos(\Delta \theta_{n-k})$$

wherein $c_n^R[k]$ denotes the value of the $k^{th}$ filter tap of the real part of a vector of complex filter taps at instant n, $\mu$ denotes an adaptation coefficient, $\epsilon_n$ denotes the slicer error at instant n, and $\Delta \theta_{n-k}$ denotes the phase inputs at time n delayed by the $k^{th}$ filter tap.

19. The method according to claim 14, wherein said step of updating comprises implementing a least means squares (LMS) adaptation algorithm represented by $$c_n^I[k] = c_{n-1}^I[k] + \mu \epsilon_n \sin(\Delta \theta_{n-k})$$

wherein $c_n^I[k]$ denotes the value of the $k^{th}$ filter tap of the imaginary part of a vector of complex filter taps at instant n, $\mu$ denotes an adaptation coefficient, $\epsilon_n$ denotes the slicer error at instant n, and $\Delta \theta_{n-k}$ denotes the phase inputs at time n delayed by the $k^{th}$ filter tap.

20. A mobile communications device, comprising:

a radio comprising a transmitter and receiver;

said receiver comprising a nonlinear phase domain equalizer, said equalizer comprising:

estimation means for estimating intersymbol interference (ISI) of a phase domain representation of an input symbol stream received by said radio receiver, said estimation means comprising:

means for calculating cosine and sine values of each input symbol;

means for filtering said cosine and sine values of said input symbols to yield an ISI estimate therefrom;

means for subtracting said ISI estimate from said input symbols to yield an equalizer output therefrom; and a demodulator operative to demodulate said equalizer output to yield an output symbol stream thereby.

21. The mobile communications device according to claim 20, wherein said input symbol stream comprises a Bluetooth Enhanced Data Rate (EDR) symbol stream.

22. The mobile communications device according to claim 20, wherein said means for filtering comprises a finite impulse response (FIR) filter.

23. The mobile communications device according to claim 22, further comprising:

a slicer operative to generate sliced output symbols as a function of said equalizer output; and update means for updating a plurality of FIR filter tap coefficients as a function of slicer error values comprising a difference between said slicer output symbols and said equalizer output.

24. The method according to claim 3, wherein said filter comprises a finite impulse response (FIR) filter.

* * * * *